United States Patent [19]

Ferguson et al.

[11] 4,078,817
[45] Mar. 14, 1978

[54] SHOCK ABSORBER ATTACHMENT FOR WHEELCHAIRS OR THE LIKE

[75] Inventors: Andrew Marvin Ferguson, Merritt Island, Fla.; Ernest Voshell Keith, Dover, Del.

[73] Assignees: Reme Enterprises, Inc., Dover, Del.; National Patent Search Associates, Inc., Arlington, Va.

[21] Appl. No.: 694,694

[22] Filed: Jun. 10, 1976

[51] Int. Cl.² ............................................. B62M 1/14
[52] U.S. Cl. .......................... 280/242 WC; 267/20 A; 280/701; 297/DIG. 4
[58] Field of Search ....... 280/701, 705, 724, 242 WC; 297/DIG. 4; 267/20 A

[56] References Cited

U.S. PATENT DOCUMENTS

| | | | |
|---|---|---|---|
| 2,262,310 | 11/1941 | Wooldridge | 267/20 A |
| 2,507,980 | 5/1950 | Knapp | 280/701 |
| 2,525,506 | 10/1950 | Wiedman | 280/701 |
| 2,577,244 | 12/1951 | Hedgreth | 267/20 A |
| 2,895,742 | 7/1959 | Johnson | 280/724 |
| 3,781,032 | 12/1973 | Jones | 267/20 A |

FOREIGN PATENT DOCUMENTS 1,183,958  10/1957  France ................................. 280/701

*Primary Examiner*—Joseph F. Peters, Jr.
*Assistant Examiner*—John A. Carroll

[57] ABSTRACT

This invention provides for a shock absorber or spring mounting attachment which can be mounted on virtually all existing wheelchair frames in order to cushion the occupant from the shock and jolting now experienced when the main drive wheels of the chair pass over irregularities in the traveled surface. In addition, this attachment reduces the tilting experienced and reduces the traction lost when the wheelchair negotiates irregularities in the traveled surface. The attachment comprises a swing arm portion for rotatably supporting a drive wheel which is coupled to housing having a compression spring therein transferring the wheelchair weight to the wheel.

7 Claims, 3 Drawing Figures

4,078,817

SHOCK ABSORBER ATTACHMENT FOR WHEELCHAIRS OR THE LIKE

BACKGROUND OF THE INVENTION

Wheelchairs have long been used by disabled persons for aiding mobility. They comprise a rigid frame, which may or may not fold for storage, on which are mounted a pair of large wheels at one end for pushing by the occupant and a set of steerable caster wheels at the other end which enable the chair to be turned and maneuvered. In all observable cases, the wheels are mounted directly on the rigid frame and thus jolts caused by any unevenness in the traveled surface are transferred directly to the seat occupied by the user of the chair. Persons confined to wheelchairs experience considerable pain and discomfort from these jolts.

SUMMARY OF THE INVENTION

This invention provides a spring mounting attachment for each wheel utilizing a coil spring to insulate the road shock from the frame of the chair and the occupant. The advantages gained by this invention are many.

The wheel base is extended, slightly altering the center of gravity to a more central location and reducing the tendency of the chair to tip when negotiating ramps and the like. The spring mounting absorbs a large portion of the jolts and bumps experienced so that their full force is not transferred to the spine of the occupant. The independent suspension provided by the spring mounting attachment absorbs a large portion of the unevenness encountered by one or the other of the wheels and reduces the degree of tilting experienced by the occupant from these sources.

A swing arm portion is rotatably mounted at its inner end on a bolt or other suitable pivot means inserted in the existing axle hole on the wheelchair frame. An axle support is provided at the other or outer end of the swing arm portion essentially the same in size as the axle hold in the wheelchair frame. The drive wheel from the chair is rotatably mounted on the axle support.

Attached to the chair frame in a suitable relationship to the swing arm portion is a spring housing portion having therein a coil spring of suitable strength to support the load imposed by the occupant of the chair, but to yield to additional loads imposed thereon as by bumps and irregularities in the traveled surface. An elongated adjusting means is provided extending longitudinally through the spring housing and secured at one end to the outer end of the swing arm portion. The adjusting means is adjusted to provide a normal level ride for the occupant and to prevent the swing arm portion from swinging down from this location in the case where the wheels are lifted from the ground as in the case in lifting or folding the chair for transport or storage.

DESCRIPTION OF THE PREFERRED EMBODIMENTS

Figure 1:
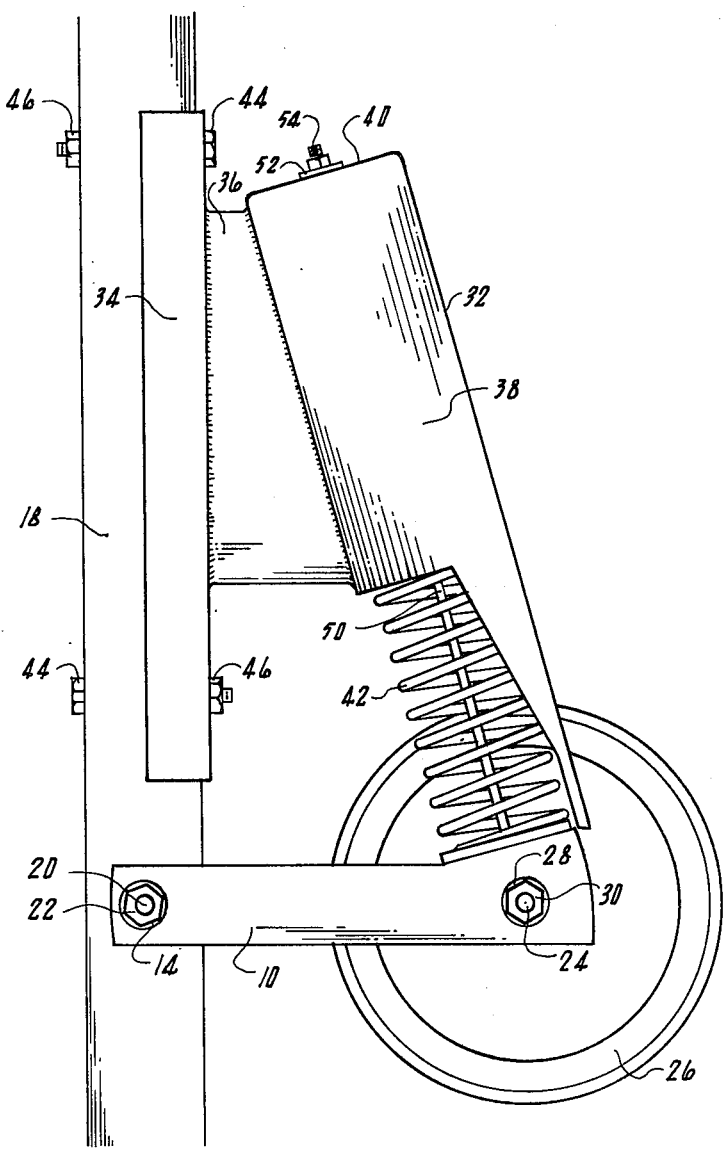
FIG. 1 is a side elevational view of the spring mounting attachment, showing its position and relationship to a wheelchair frame and wheel.

Referring now to the drawings, a swing arm portion 10, preferably constructed of a suitable metal or other suitable material of sufficient rigidity to provent bending or twisting under the stresses imposed on it, is provided with holes 12 at its inner end into which shoulder bushings 14 or other suitable bearing means are closely fitted in any suitable manner.

The swing arm portion 10 with the bushings 14 inserted is fitted over the existing axle mounting hole 16 in a wheelchair frame member 18, and rotatably secured thereon with a bolt 20 and lock nut 22. The existing wheelchair axle bolt 24 may be inserted through the wheel hub 26 and then through the axle mounting bushing 28 which is secured to the outer or other end of the swing arm portion 10 and has an inner opening essentially the same size as the axle mounting hold 16 in the wheelchair frame member 18. The axle bolt 24 is secured in position by lock nut 30 or other suitable means.

A spring housing portion, generally 32, comprises a mounting portion or plate 34 substantially conforming to and mounted on the frame member 18 of the wheelchair, a web or spacer portion or plate 36, and a generally cylindrical housing 38 with one closed end 40 in which a helical spring 42 is mounted. The spring housing portion 32 may be cast, machined, or constructed of separate pieces held in rigid relationship by welding or other suitable means and is preferably constructed from metal or any other suitable material. Suitable bearing means, such as a sleeve (not shown) may be provided between the spring 42 and housing 38.

The spring housing portion 32 is mounted on the wheelchair frame member 18 by means of nuts 46 and bolts 44 extending through aligned holes 48 in the mounting plate 34 and the wheelchair frame 18.

An elongated adjusting means, such as a bolt 50 having a threaded end, is inserted through a hole 51 at the outer end of the swing arm portion 10, through the center of the spring 42, and through a hole 53 in the upper closed end 40 of the housing 38. The bolt 50 is secured in position by means of a washer 52 and nut 54. Rotation of the nut 54 on the threaded end of the bolt 50 will result in adjustment of the compression of the spring 42.

Figure 3:
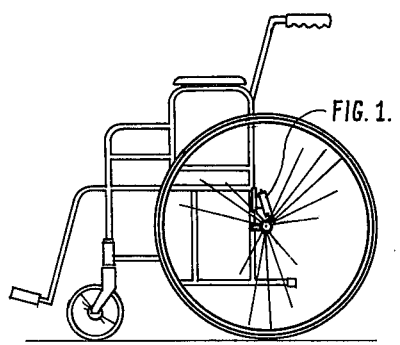
FIG. 3 is a side view of a wheelchair with the subject attachment installed.
Figure 2:
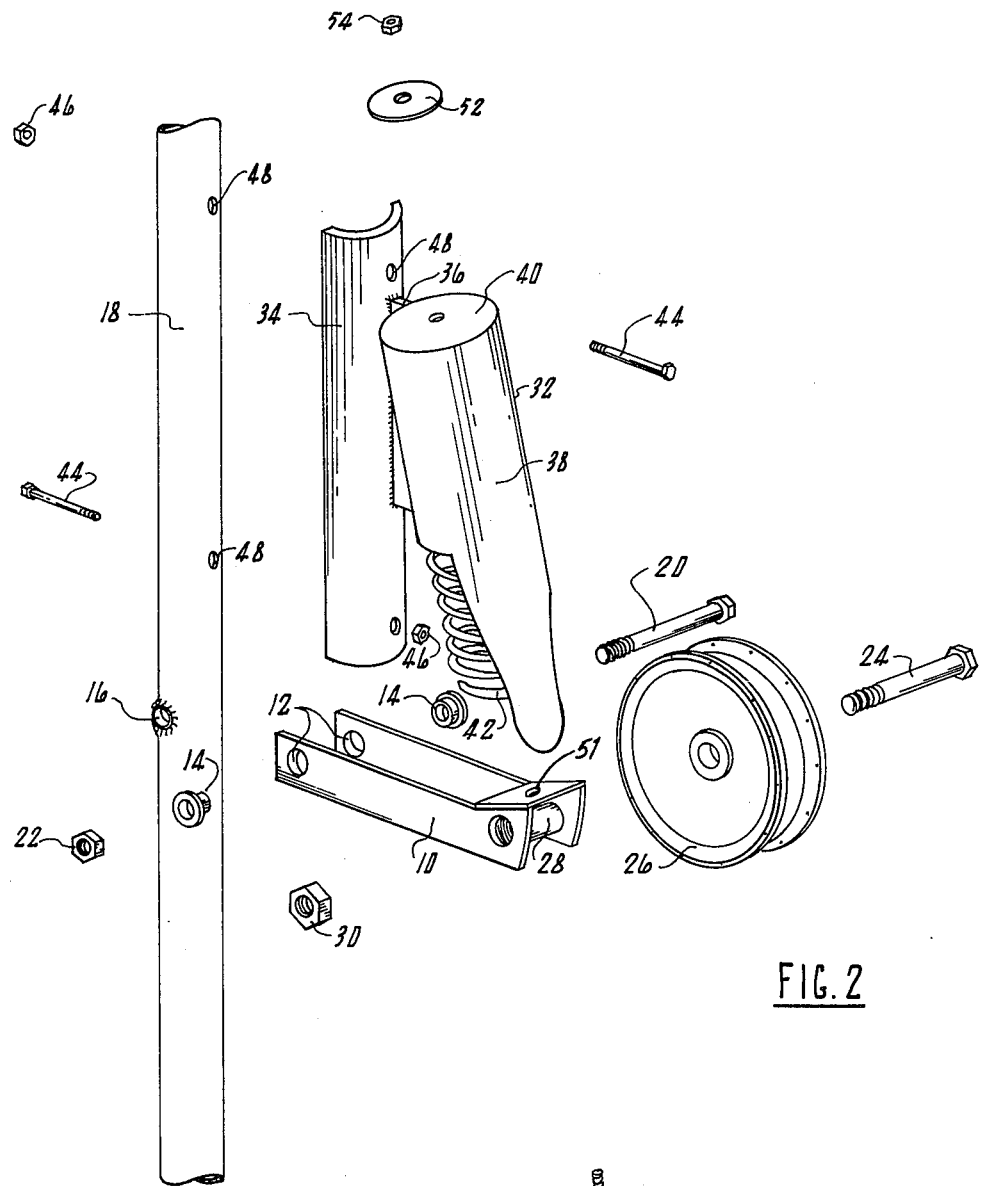
FIG. 2 is an exploded perspective view of the subject attachment, illustrating all of the component parts and their relationships.

In operation, a spring mounting attachment is installed on both main wheels of a wheelchair as shown in FIG. 3. The strength of the spring 42 is matched generally to the load imposed on it by the occupant of the chair. The adjusting bolt 50 is adjusted by means of the nut 54 to adjust the compression of spring 42 and to level the chair as necessary.

When passing over uneven surfaces or bumps, the main wheels of the wheelchair are enabled to independently react to the unevenness by compression of the spring 42 in each spring mounting attachment. Owing to the spring strength being easily matched to the load of the occupant, normally encountered bumps in the path of only one of the mean wheels are almost totally absorbed by the spring action of the attachment without affecting the level ride of the chair, thereby eliminating a great portion of the side-to-side rocking presently experienced by wheelchair occupants.

The subject attachment serves to increase the wheelbase of the chair. Since the usual wheelchair configuration places the occupant load almost directly over the main wheels, a slight movement of these wheels away from this location produces a considerable redistribution of weight among the wheels. This redistribution of weight, accomplished by the use of the subject spring mounting attachment, reduces the tendency of the wheelchair to overbalance to the rear and uncontrollably fall backwards when negotiating uphill obstacles such as ramps, stairs or curbs.

It is understood that this invention is not confined to the particular construction and arrrangement of parts herein illustrated and described, but embraces such modified forms thereof as come within the scope of the following claims.

What is claimed is:

1. In a wheelchair or similar vehicle having a generally vertically extending leg with a substantially transverse opening therethrough for receiving the axle of a support wheel therefor, the improvement comprising:
    a. a swing arm portion, means extending through the leg opening for pivotally supporting one end of said swing arm portion on said leg, said swing arm portion having means at the other end thereof for rotatably supporting a support wheel for the wheelchair,
    b. a spring housing portion fixedly mounted on the leg above the swing arm portion, and
    c. a spring disposed and acting between said housing portion and said swing arm portion to provide a shock absorbing means for a support wheel rotatably mounted on said swing arm portion.

2. The wheelchair of claim 1 wherein said spring extends and acts generally tangential to the rotational arc of said other end of said swing arm portion.

3. The wheelchair of claim 1 wherein said spring is a helical compression spring and has one end disposed within said housing portion and the other end in engagement with said other end of said swing arm portion.

4. The wheelchair of claim 3 wherein said housing portion is generally cylindrical.

5. The wheelchair of claim 4 wherein means are provided to adjust the force of said spring, said adjusting means comprising a bolt extending through said spring, said housing and said other end of said swing arm portion, said bolt having a threaded portion at one end, and a nut mounted on said threaded portion and rotatably movable thereon to adjust the compression of said spring.

6. The wheelchair of claim 3 wherein means are provided for adjusting the compression of said spring and for retaining said spring between and in engagement with said housing portion and said other end of said swing arm portion.

7. The wheelchair of claim 6 wherein said adjusting means comprises a bolt extending through said spring, said housing portion and said other end of said swing arm portion to limit the downward rotation of the swing arm portion and adjust the normal level ride of the vehicle.

* * * * *